United States Patent
Gibas et al.

(10) Patent No.: US 10,977,251 B1
(45) Date of Patent: Apr. 13, 2021

(54) JOIN INDEX BITMAP FOR NON-EQUALITY QUERY CONDITIONS

(71) Applicant: Teradata US, Inc., Dayton, OH (US)

(72) Inventors: Michael A. Gibas, Torrance, CA (US); Grace K. Au, Ranch Palos Verdes, CA (US)

(73) Assignee: Teradata US, Inc., San Diego, CA (US)

( * ) Notice: Subject to any disclaimer, the term of this patent is extended or adjusted under 35 U.S.C. 154(b) by 729 days.

(21) Appl. No.: 15/393,818

(22) Filed: Dec. 29, 2016

Related U.S. Application Data

(60) Provisional application No. 62/273,356, filed on Dec. 30, 2015.

(51) Int. Cl.
*G06F 16/2453* (2019.01)
*G06F 16/16* (2019.01)
*G06F 16/22* (2019.01)
*G06F 16/28* (2019.01)
*G06F 16/2455* (2019.01)

(52) U.S. Cl.
CPC ...... *G06F 16/24544* (2019.01); *G06F 16/162* (2019.01); *G06F 16/221* (2019.01); *G06F 16/2237* (2019.01); *G06F 16/24561* (2019.01); *G06F 16/282* (2019.01)

(58) Field of Classification Search
CPC ............. G06F 16/24544; G06F 16/282; G06F 16/2237; G06F 16/162; G06F 16/221; G06F 16/24561
See application file for complete search history.

(56) References Cited

U.S. PATENT DOCUMENTS

| | | | | |
|---|---|---|---|---|
| 5,884,307 | A * | 3/1999 | Depledge | G06F 16/22 |
| 5,987,453 | A * | 11/1999 | Krishna | G06F 16/24561 |
| 6,081,800 | A * | 6/2000 | Ozbutun | G06F 16/2237 |
| 6,615,206 | B1 * | 9/2003 | Jakobsson | G06F 16/2456 |
| 7,020,661 | B1 * | 3/2006 | Cruanes | G06F 16/2456 |
| 7,383,270 | B1 * | 6/2008 | Kostamaa | H03M 7/30 707/693 |
| 2004/0054683 | A1 * | 3/2004 | Nishizawa | G06F 16/24544 |
| 2012/0166400 | A1 * | 6/2012 | Sinclair | G06F 16/23 707/692 |
| 2017/0031976 | A1 * | 2/2017 | Chavan | G06F 16/2453 |

* cited by examiner

*Primary Examiner* — Cam Y T Truong
(74) *Attorney, Agent, or Firm* — Randy L. Campbell, Jr.

(57) ABSTRACT

A data store system may include an array of persistent storage devices configured to store a plurality of data store tables. The data store system may further include a processor in communication with the storage device. The processor may receive a query containing a non-equality join condition on a first column from a first data store table and a second column on a second data store table. The processor may generate a bitmap based on the join condition. The bitmap indicate respective matches between the first column and second column in accordance with the non-equality join condition. The bitmap may also be used each time the non-equality join condition is present in another received query. A method and computer-readable medium may also be implemented.

20 Claims, 10 Drawing Sheets

FIG. 6

| T1 COLUMN VALUE ROWID | COMPRESSED BITSTRING | PAD WORD |
|---|---|---|
| C1-V1 ROW ID | 8000000A000200080000036 | 8000F4240 |

| JI BITMAP ROW INDEX | T2 COLUMN ROW ID |
|---|---|
| 1 | C2-V1 ROW ID |
| 2 | C2-V2 ROW ID |
| ⋮ | ⋮ |
| n | C2-Vn ROW ID |

700, 702, 704

JOIN INDEX BITMAP FOR NON-EQUALITY QUERY CONDITIONS

CLAIM OF PRIORITY

This application claims the benefit of priority under 35 U.S.C. 119(e) of U.S. Provisional Patent Application Ser. No. 62/273,356 filed on Dec. 30, 2015, which is hereby incorporated by reference in its entirety.

BACKGROUND

Data store systems, such as database and file systems, store vast amounts of logically related data in the form of data tables. Queries may be used to perform various utilities and analytics on the data tables to generate desired results. These queries may include conditions to be evaluated based on independent data tables, which require table joins to be performed. Conditions of equality, such as column values from columns of independent tables, are typically manageable conditions for a data store system and may allow a join index to be created. The join index may be used again if the equality conditions are expressed in a subsequent query. Join indices remove computational overhead that would otherwise be required each time the equality condition was expressed in a query. However, in instances involving non-equality join conditions, standard join indices are not as manageable or possible. For example, a query may contain the following statement:

SELECT STORED, CUST.ID
FROM STORE, CUST
WHERE
DISTANCE(STORE.LOCATION,
CUST.LOCATION)
<5.

This query includes a function "distance" that may determine the distance between stores and customers and identify those that are within 5 miles of one another. The stores and customers are maintained in independent tables "store" and "cust", respectively, which requires a "geographic join". Traditionally, in order to perform this query, we need to do a product join and evaluate the condition for all (e.g., number of stores×number of customers=1 billion) combinations to determine the matching combinations. Without a structure to capture this relationship, subsequent queries would also need to perform a Cartesian product of evaluations. Other non-equality conditions may be similarly cumbersome to evaluate using traditional techniques, such as non-equality conditions involving similarity searching (e.g., customers, documents, images, etc.), unstructured data comparisons (e.g., XML and JSON data columns of different tables), temporal comparisons (e.g., period defined by a temporal column in one table exhibits some relationship with a period defined by some period or another temporal column), and anomaly detection (e.g., queries designed to search/detect rare cases would result in few matches and the index would be very small size, where new matches are detected in real time). Thus, it would be desirable to maintain relationships for non-quality join conditions for subsequent use.

SUMMARY

According to one aspect of the present disclosure, a data store system may include an array of persistent storage devices configured to store a plurality of data store tables. The data store system may further include a processor in communication with the storage device. The processor may receive a query containing a non-equality join condition on a first column from a first data store table and a second column on a second data store table. The processor may generate a bitmap based on the join condition. The bitmap indicate respective matches between the first column and second column in accordance with the non-equality join condition. The bitmap may also be used each time the non-equality join condition is present in another received query.

According to another aspect of the present disclosure, a method may include receiving a query containing a non-equality join condition on a first column from a first data store table and a second column on a second data store table. The method may further include generating a bitmap based on the join condition. The bitmap may indicate respective matches between the first column and second column in accordance with the non-equality join condition. The bitmap may also be used each time the non-equality join condition is present in another received query.

According to another aspect of the present disclosure, a computer-readable medium may be encoded with a plurality of instructions executable by a processor. The plurality of instructions may include instructions to receive a query containing a non-equality join condition on a first column from a first data store table and a second column on a second data store table. The plurality of instructions may further include instructions to generate a bitmap based on the join condition. The bitmap may indicate respective matches between the first column and second column in accordance with the non-equality join condition. The bitmap may also be used each time the non-equality join condition is present in another received query.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 6 is an example of a storage data structure.

FIG. 7 is an example of a translation table.

DETAILED DESCRIPTION OF THE FIGURES

Figure 1:
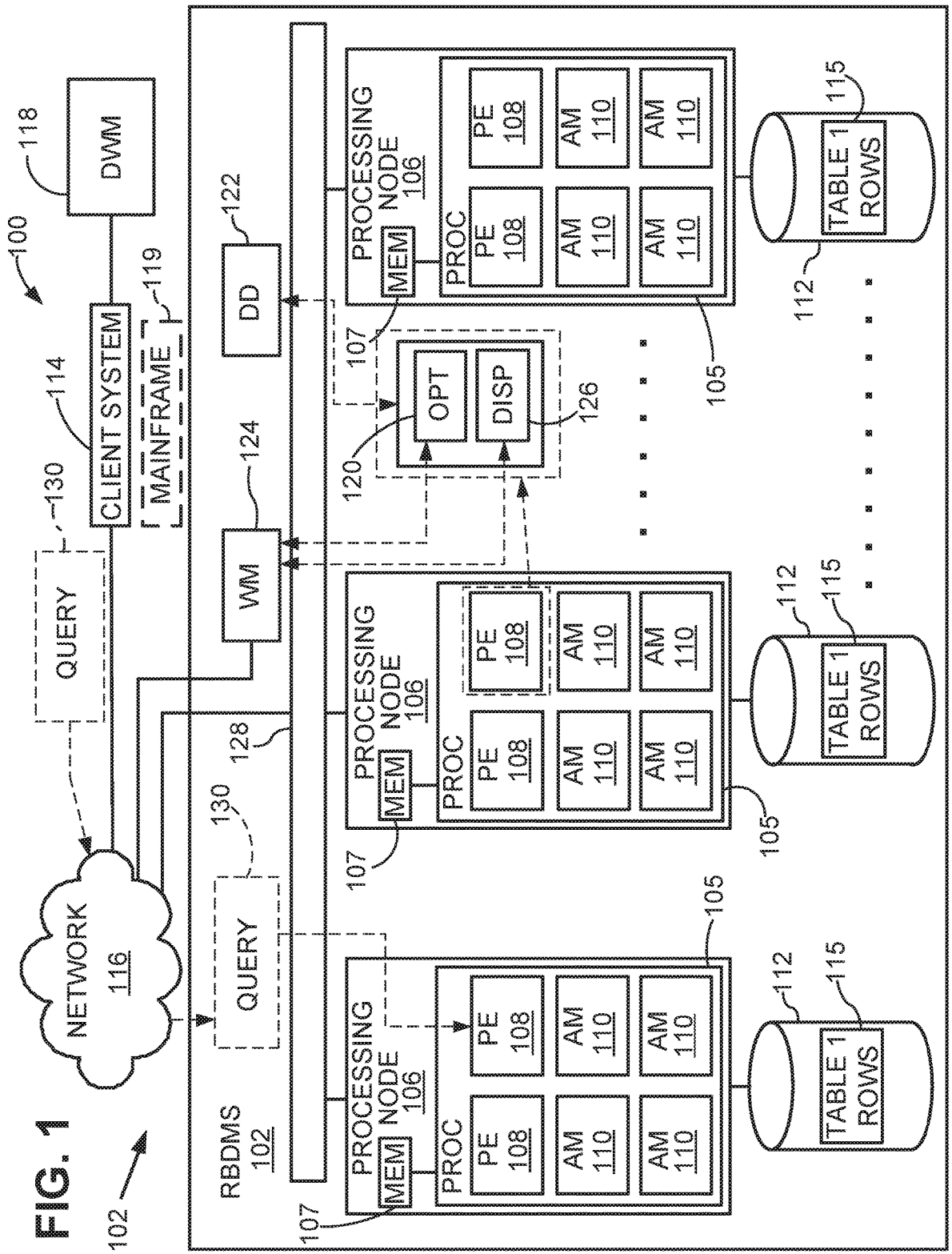
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RDBMS 102 may be a massive parallel processing (MPP) system having an array of processing units and distributed memory. In alternative examples, the RDBMS 102 may implement a single processing unit, such as in a symmetric multiprocessing (SMP) system configuration. The RDBMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing unit arrays such as parsing engine (PE) modules 108 and access modules (AM) 110. As described herein, a module, such as the parsing engine modules 108 and access modules 110, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 107, for example, that comprises instructions executable with the processor 105 or other processors to implement one or more of the features of the module. When any one of the module includes the portion of the memory 107 that comprises instructions executable with the processor, the module may or may not include the processor. In some examples, each module may just be the portion of the memory 107 or other physical memory that comprises instructions executable with the processor 105 or other processor to implement the features of the corresponding module without the module including any other hardware. Because each module includes at least some hardware even when the included hardware comprises software, each module may be interchangeably referred to as a hardware module, such as the parsing engine hardware module or the access hardware module. The access modules 110 may be access modules processors (AMPs), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 105 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RDBMS 102 stores data in one or more tables in the DSFs 112. In one example, rows 115 of a table, "Table 1," are distributed across the DSFs 112 and in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to DSFs 112 and associated access modules 110 by a hash bucket map. The characteristics of the columns chosen for the primary index determine how evenly the rows are distributed.

Rows of each stored table may be stored across multiple DSFs 112. Each parsing engine module 108 may organize the storage of data and the distribution of table rows. The parsing engine modules 108 may also coordinate the retrieval of data from the DSFs 112 in response to queries received, such as those received from a client computer system 114 connected to the RDBMS 102 through connection with a network 116. The network 116 may be wired, wireless, or some combination thereof. The network 116 may be a virtual private network, web-based, directly-connected, cloud-based, or some other suitable network configuration. In one example, the client computer system 114 may run a dynamic workload manager (DWM) client 118. Alternatively, the database system 100 may include a mainframe 119 used to interact with the RDBMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RDBMS 102 as well as fields of each database, for example. Further, the data dictionary module 122 may specify the type, length, and/or other various characteristics of the stored tables. The RDBMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary may be stored in the DSFs 112 or some other storage device and selectively accessed.

The RDBMS 102 may include a workload management (WM) module 124, which in one example may be Teradata Active System Management. The WM module 124 may be implemented as a "closed-loop" system management (CLSM) architecture capable of satisfying a set of workload-specific goals. In other words, the RDBMS 102 is a goal-oriented workload management system capable of supporting complex workloads and capable of self-adjusting to various types of workloads. The WM module 124 may communicate with each optimizer module 120, as shown in FIG. 1, and is adapted to convey a confidence threshold parameter and associated parameters to the optimizer module 120 in communication. Further, the WM module 124 may communicate with a dispatcher module 126 of each parsing engine module 108 (as shown in detail FIG. 1 for parsing engine module 108) to receive query execution plan costs therefrom, and to facilitate query exception monitoring and automated modifications of confidence threshold parameters in accordance with disclosed embodiments. The DWM client 118 may communicate with the WM module 124 via the network 116.

The WM module 124 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. In accordance with disclosed embodiments, the WM module 124 is adapted to facilitate control of the optimizer module 120 pursuit of robustness with regard to workloads or queries.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g., processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally or alternatively, more than one channel may also allow distributed communication to reduce the possibility of an undesired level of communication congestion among processing nodes 106.

Figure 2:
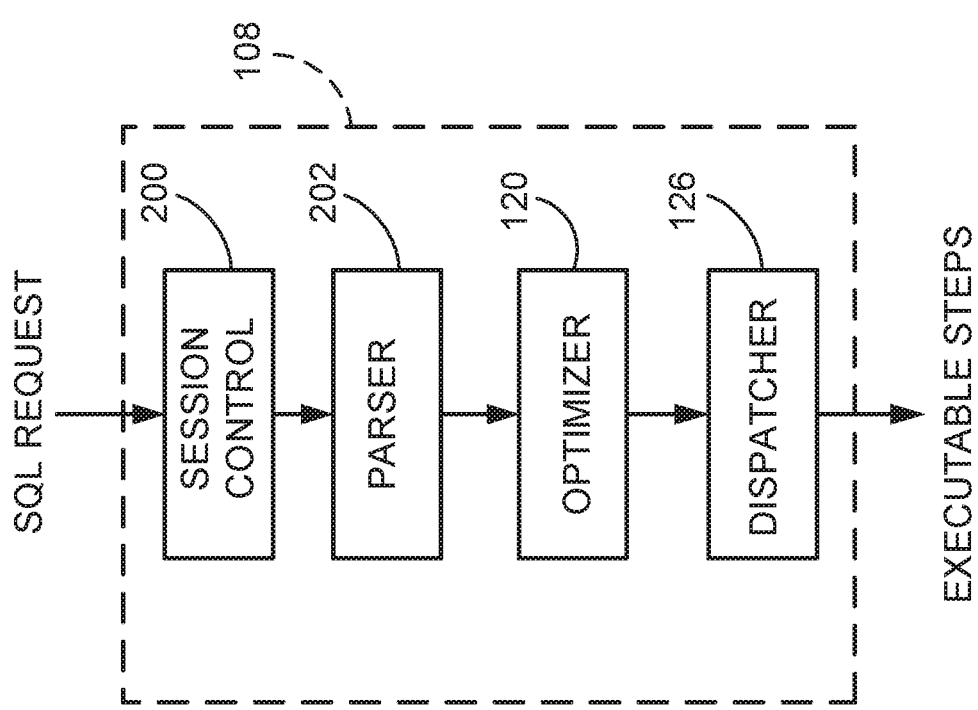
FIG. 2 is a block diagram of a portion of the example database system of FIG. 1.

In one example system, each parsing engine module 108 includes three primary components: a session control module 200, a parser module 202, and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, an SQL request may be received such as through submission by a user and the SQL request is routed to the parser module 202.

Figure 3:
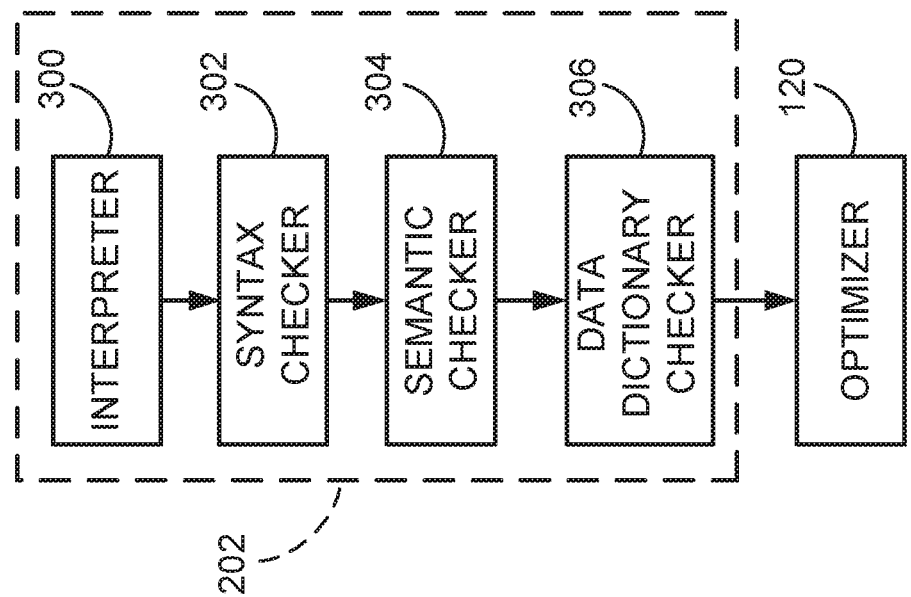
FIG. 3 is a block diagram of another portion of the example database system of FIG. 1.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

In one example, to facilitate implementations of automated adaptive query execution strategies, such as the examples described herein, the WM 124 is configured to monitor runtime exception criteria. The WM 124 monitoring takes place by communicating with the dispatcher module 126 as it checks the query execution step responses from the access modules 110. The step responses include the actual cost information, which the dispatcher module 126 may then communicate to the WM 124 which, in turn, compares the actual cost information with the estimated costs of the optimizer module 120.

Figure 4:
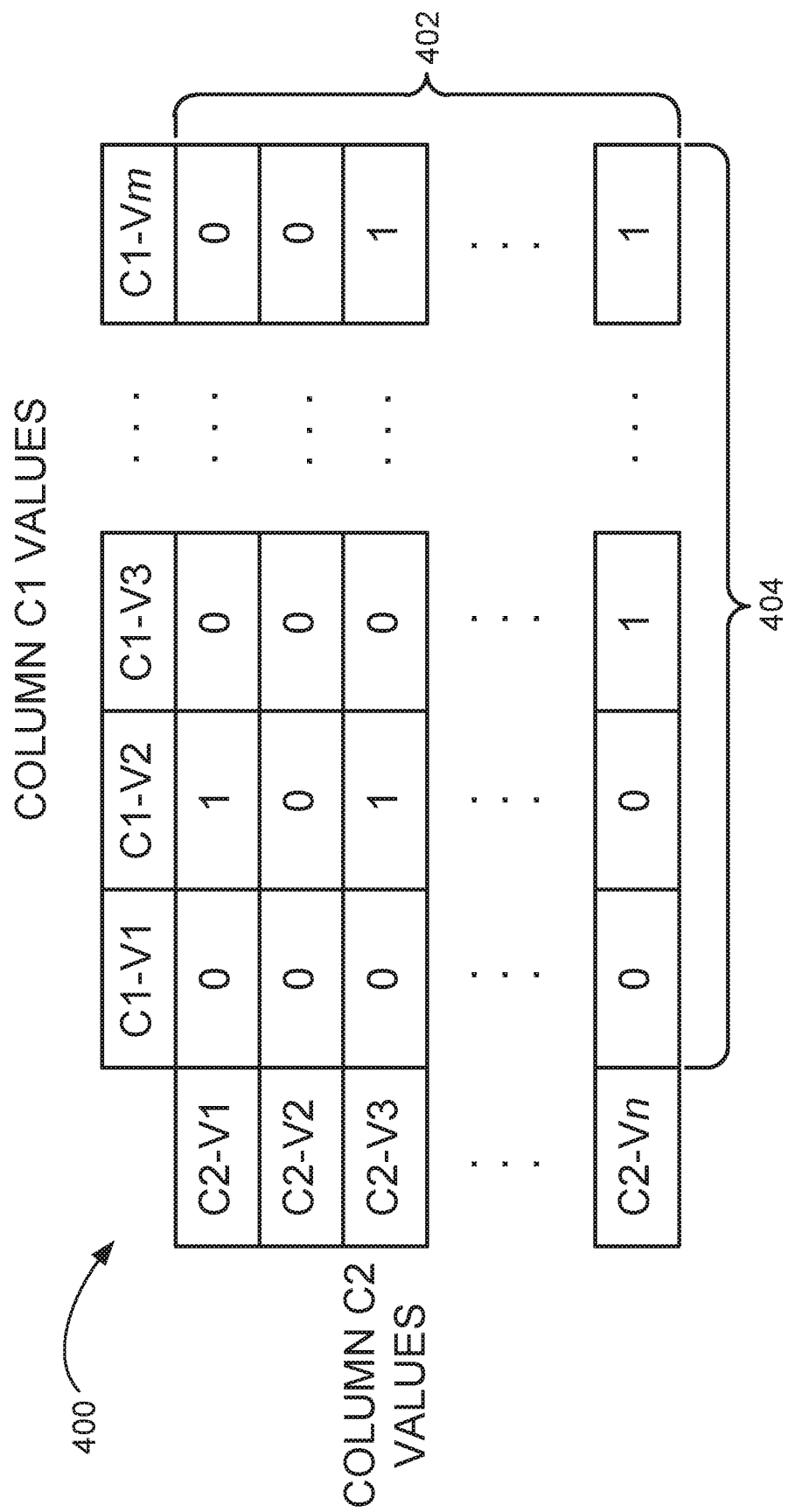
FIG. 4 is an example of a bitmap indicating a relationship between two independent-table columns in accordance with a join condition.

During operation, various queries, such as the query 130, may contain a non-equality join condition expressing some relationship between two columns of independent tables. In one example, this non-equality join condition may be evaluated and the results may be maintained in a join index (JI) bitmap that expresses the non-equality join condition relationship between two columns. By maintaining the relationship, the RDBMS 102 is not required to repeat the determination of this relationship if resubmitted in another query. FIG. 4 provides an example of JI bitmap 400 which may indicate matches and non-matches between two columns of independent tables in accordance with a non-equality join condition. For example, a column from table T1 ("column C1") and a column from table T2 ("column C2") may be expressed in a non-equality join condition. The JI bitmap 400 may include a field of bits, with each bit indicating whether or not each pair of values from column C1 and column C2 meet the non-equality join condition. One of the columns may serve as the "rows" 402 of the JI bitmap 400 and the other column may serve as the "columns" 404 of the JI bitmap 400. For example, in FIG. 4, each column 404 of the JI bitmap 400 represents a value of column C1 and each row 402 of the JI bitmap 400 represents a value of column C2. In the example of FIG. 1, each JI bitmap column 404 includes m columns representing m values of column C1 and each JI bitmap row 402 includes n rows in representing n values of column C2. In FIG. 4, each value of the C1 column corresponds to a row of table T1 and is individually designated as C1-V1 through C1-Vm and each value of the C2 column corresponds to a row of table T2 is individually designated as C2-V1 through C2-Vn.

Each row in tables T1 and T2 may have a unique row identifier ("rowid") allowing each row in the RDBMS 102 to be identified. The JI bitmap 400 includes a cell for each unique combination of the respective rowid's associated with each row of column C1 and column C2. The RDBMS 102 may evaluate the non-equality join condition for each unique combination. If the condition is true for the particular unique combination a bit may be set to "1" for the corresponding cell indicating a match between the column-value pair. If the condition is false for the particular unique combination a bit may be set to "0" for the corresponding cell indicating a non-match between the column-value pair.

Figure 5A:
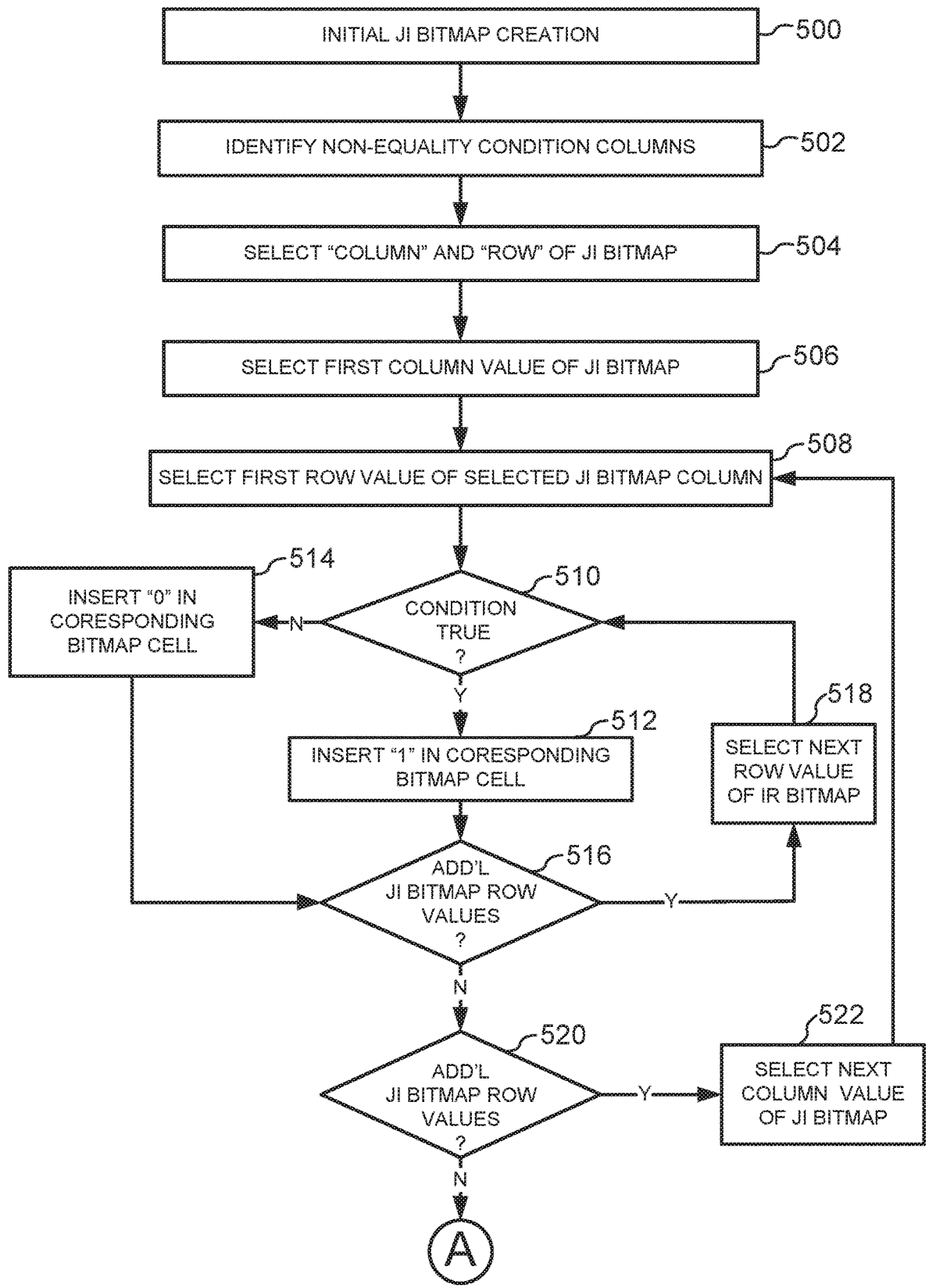
FIGS. 5A and 5B are an operational flow diagram of an example database generating a bitmap based on a non-equality join condition.
Figure 5B:
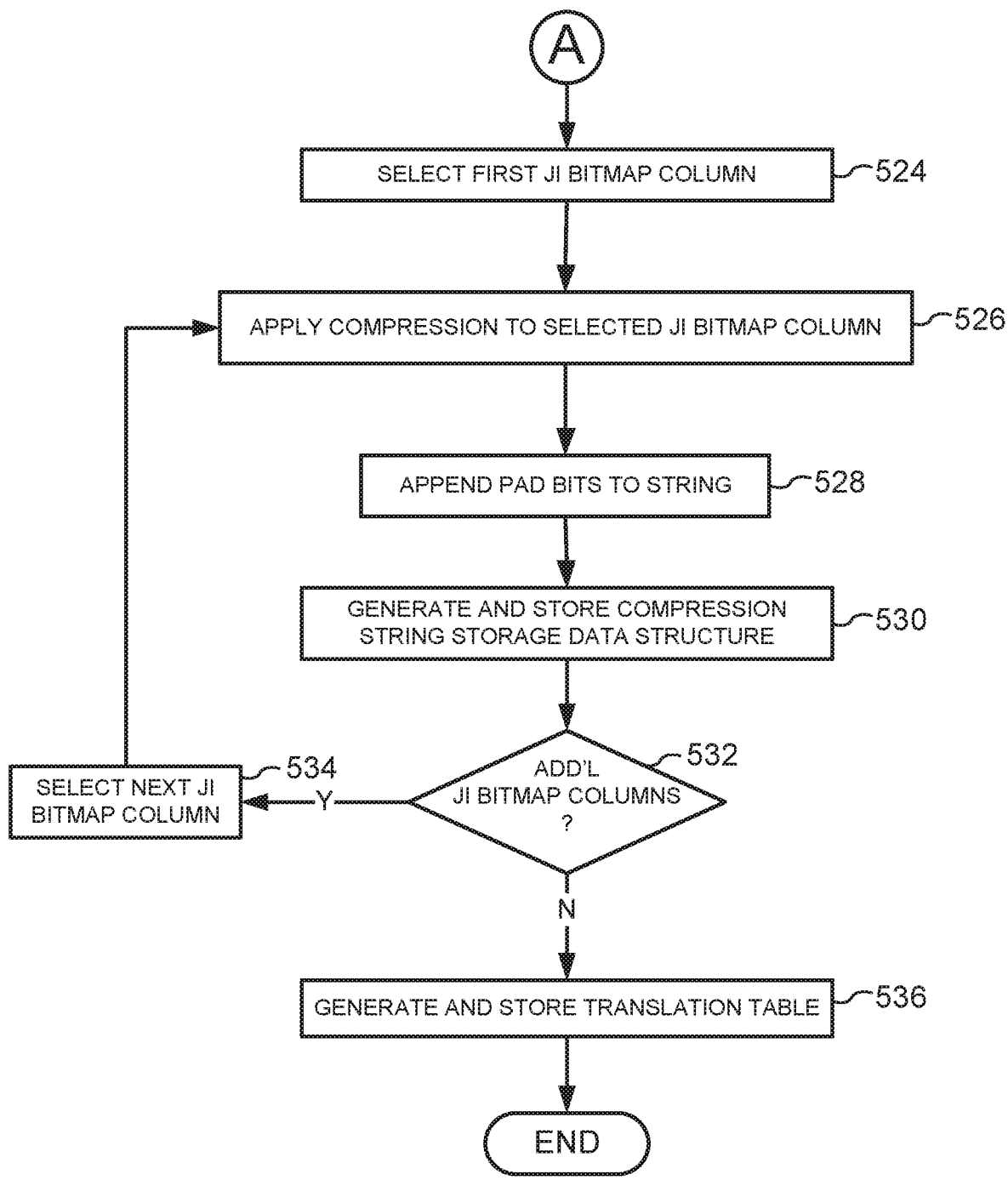

FIGS. 5A and 5B are an operational flow diagram of the creation and compression of a JI bitmap, such as the JI bitmap 400. In one example, the RDBMS 102 may initiate creation of the JI bitmap 400 (500). In one example, this may be triggered by a join index creation statement indicating the particular non-equality join condition to be evaluated by the RDBMS 102. The RDBMS 102 may identify the two columns involved in the non-equality join condition (502). The RDBMS 102 may select which table column will provide the JI bitmap rows 402 and which table column provides the JI bitmap columns 404 (504). In one example, this determination may be based on the relative size of the columns or associated source tables with respect to one another. JI bitmap creation may be performed across multiple processing nodes 110 of the RDBMS 102, which may require one of the involved tables to be replicated across the processing nodes 110, in which replicating the smaller of the source tables, T1 and T2, may be more cost effective with respect to system resources. With this consideration, the smaller table T2 may be replicated, the relevant column, the C2 column, of which will serve as the rows 402 of the JI bitmap 400. The other column involved in the non-quality join condition, the C1 column of table T1, may serve as the columns 404 of the JI bitmap 400. Other manners of selecting the rows 402 and columns 404 of the JI bitmap 400 may be used such as the order in which the C1 column and C2 column appear in the non-equality join condition, for example.

Once the JI bitmap rows 402 and columns 404 have been established, the RDBMS 102 may select the first column value of the JI bitmap 400 (506), such as C1-V1 in the JI bitmap 400, for example. The RDBMS 102 may select the first row value of the JI bitmap 400 (508), such as C2-V1 of the JI bitmap 400. The non-equality join condition may be evaluated against the pair of values (510). If the condition is true indicating a match, the RDBMS 102 may set a bit to "1" in the JI bitmap 400 for the cell corresponding to the value pair (512). If the condition is false indicating a non-match (514), the corresponding bit may be set to "0". The RDBMS 102 may determine if additional row values exist in the JI bitmap 400 (516). If so, RDBMS 102 may select the next row value from the JI bitmap 400 (518) and evaluate the non-equality join condition against the selected row value and the selected column value (510), with the corresponding bit in the JI bitmap 400 being set dependent on the outcome. Each row value of in the JI bitmap 400, which is each column value of the T2 column in the JI bitmap 400, may be similarly selected and evaluated against the selected column value of the JI bitmap 400 until there are no additional rows of the JI bitmap 400 to evaluate for the selected column (516). If no additional rows are to be evaluated, the RDBMS 102 may determine if additional columns 404 of the JI bitmap 400 to evaluate exist (520). If so, the next column value of the JI bitmap columns 404 may be selected (522) and the first row value of the JI bitmap rows 402 may again be selected (508) and the value pair may be evaluated against the non-equality join condition (510). This process may continue for each row-column combination until the RDBMS 102 determines that all column values have been evaluated (522), which indicates that the JI bitmap 400 is completed.

Upon completion of the JI bitmap 400 or, alternatively, upon completion of one column 404 of the JI bitmap 400, each column of the JI bitmap 400 may be compressed. The RDBMS 102 may select the first column 404 of the JI bitmap 400 (524). The RDBMS 102 may compress the selected column 404 of the JI bitmap 400 (526). In one example, the column 404 may be selected in accordance with a Word Aligned Hybrid compression technique. In such a technique, each column 404 may be divided into as many 31-bit segments as possible. The RDBMS 102 may determine if each segment contains all "1's" or "0's". For continuous sets of segments that include the same bit, 1 or 0, the RDBMS 102 may compress the entire set into one or more word-bytes. Each compressed word-byte, known as a "fill" word, may be 32 bits in length. The first bit of each fill word may be set to 1 indicating the word-byte is a "fill" word. The second bit may indicate whether the compressed word-byte is expressing a string of non-equality join condition matches, represented as "1's", or a string of non-matches, represented as "0's". Thus, the second bit set to "1" indicates a string of matches and the second bit set to "0" indicates a string of non-matches. The other 30 bits in the fill word maybe used to encode the number of consecutive non-matches or matches represented by the fill word.

For 31-bit segments that contain a combination of matches and non-matches, a "literal" word-byte may be created, which sets a first bit to "0" indicating the word-byte is a literal word-byte with the other 31 bits being from the particular segment. Under this particular compression technique, no fill words are generated until at least two consecutive 31 bit segments of matches or non-matches is present. String of compressed bits may be concatenated into a single string, with each literal and fill word being represented in 32 bit increments of the bit string. Once the JI bitmap column 404 is compressed, pad bits may be appended to the end of the compressed string of bits representing the JI bitmap column 404 (528). In one example, the pad bits may include a pad word, which adds 32 bits to the end of the compressed string. The pad word may allow expansion to column C2 involved in the non-equality join index without requiring additional bits to be added. In one example, the pad word is stored as a fill word "800F4240" which represents 3 million "0" bits in hexadecimal format. These serve as placeholders for future new rows to be added to the table T2 with an initial "0" bit which indicates a non-match between the column C2 values in these future table T2 rows and the column C1 value that is indexed by the JI bitmap column 404. Thus, when a T2 row with a new value of column C2 is added, the pad word does not need to be updated if the new value and the column C1 value that is indexed by the JI bitmap column 404 do not satisfy the non-equality join condition. The pad word may be updated when a new value in the C2 column and the C1 column value that is indexed by the JI bitmap column 404 satisfy the non-equality join condition, which requires a "1" to be set in the bit that corresponds to the new value of column C2 in the JI bitmap 400. If the position of that bit is less than 32, the pad word is updated to a literal word according to the position of the "1" bit and added to the bit string representing the JI bitmap column 404. A new pad word is then added. If the position of that bit is greater than 31, the pad word is updated to a fill word according to the number of preceding "0" bits and a literal word with a "1" bit in the corresponding position followed by a new pad word are added. Thus, in the instance that a column 404 of the JI bitmap 400 does not evenly divide into 31 bit segments, leftover bits of JI bitmap column 404 may be followed by zeroes to complete a 31-bit segment. These leftover bits may be used the same way as the pad word when new table T2 rows are added.

Each column value of column C1 may be associated with a particular row of the table T1. In one example, each column value of column C1 may be associated with the rowid of a respective row of the table T1 used by the RDBMS 102 to locate row stored in the DSFs 112. The RDBMS 102 may generate and store a storage data structure that stores the rowid of the respective row of table T1 and the compression string and pad word for the corresponding column of the JI bitmap 400 (530). In the example architecture described for the RDBMS 102, each storage data structure may be stored local to an access module 110 responsible for the row of table T1 identified by the rowid. Thus, each storage data structure will also have its own respective rowid so that it may be located by the RDBMS 102.

FIG. 6 is an example of a storage data structure 600 that includes a row id column 602, compressed JI bitmap bit string column 604, and a pad word column 606. In the example architecture described for the RDBMS 102, each access module 110 may be responsible for specific rows of tables of the database maintained by the RDBMS 102. In such an example, each data structure 600 may be stored such that the access module 110 responsible for the table T1 row that includes a column C1 may also be responsible for the data structure 600 containing the JI bitmap information for that table T1 row. Thus, each row of the data structure 600 may have its own rowid (not shown) allowing it to be located by the RDBMS 102. The compressed bit string column 604 may contain the compressed bit string generated at (526) in FIG. 5. For example, if the column 404 of the JI bitmap 400 for column value C1-V1 contained a bit string of 2000 bits, which were entirely zeroes except for a "1" in the three-hundred twentieth position, the column 404 may be encoded as three 32-bit words. FIG. 6 represents this in hexadecimal format as a fill word "8000000A" which represents 310 "0" bits, followed by a literal word "00200000" which represents 9 "0" bits, a "1" bit and 21 "0" bits, followed by another fill word "80000036" which represents 1674 "0" bits. The pad word of "800F4240" represents 3 million "0" bits.

Returning to FIG. 5, the RDBMS 102 may determine if additional columns 404 of the JI bitmap 400 exist (532). If so, the RDBMS 102 may select the next JI bitmap column 404 (534) and begin the compression routine (526), pad bit appending (528), and storage structure creation (530). This may continue for each JI bitmap column 404 until the RDBMS 102 determines that each JI bitmap column 404 has been addressed (536).

Once the RDBMS 102 determines that all JI bitmap columns 404 have been addressed (532), the RDBMS 102 may generate and store a translation table for the selected JI bitmap column 400 (536). FIG. 7 provides an example of a translation table 700 that may include a JI bitmap index column 702 that indexes each row in the JI bitmap 400 with an index representing the location of the row 402 within the JI bitmap 400. For example, the first row 402 of the JI bitmap 400 that represents the value C2-V1 of table T2 may have an index of 1 in the translation table 700. The translation table 700 may be include a rowid column 704, which provides the rowid for the corresponding table T2 row allowing the RDBMS 102 to retrieve other columns in the table T2 row. The translation table 700 may be replicated so that it is available to every access module 110.

Figure 8:
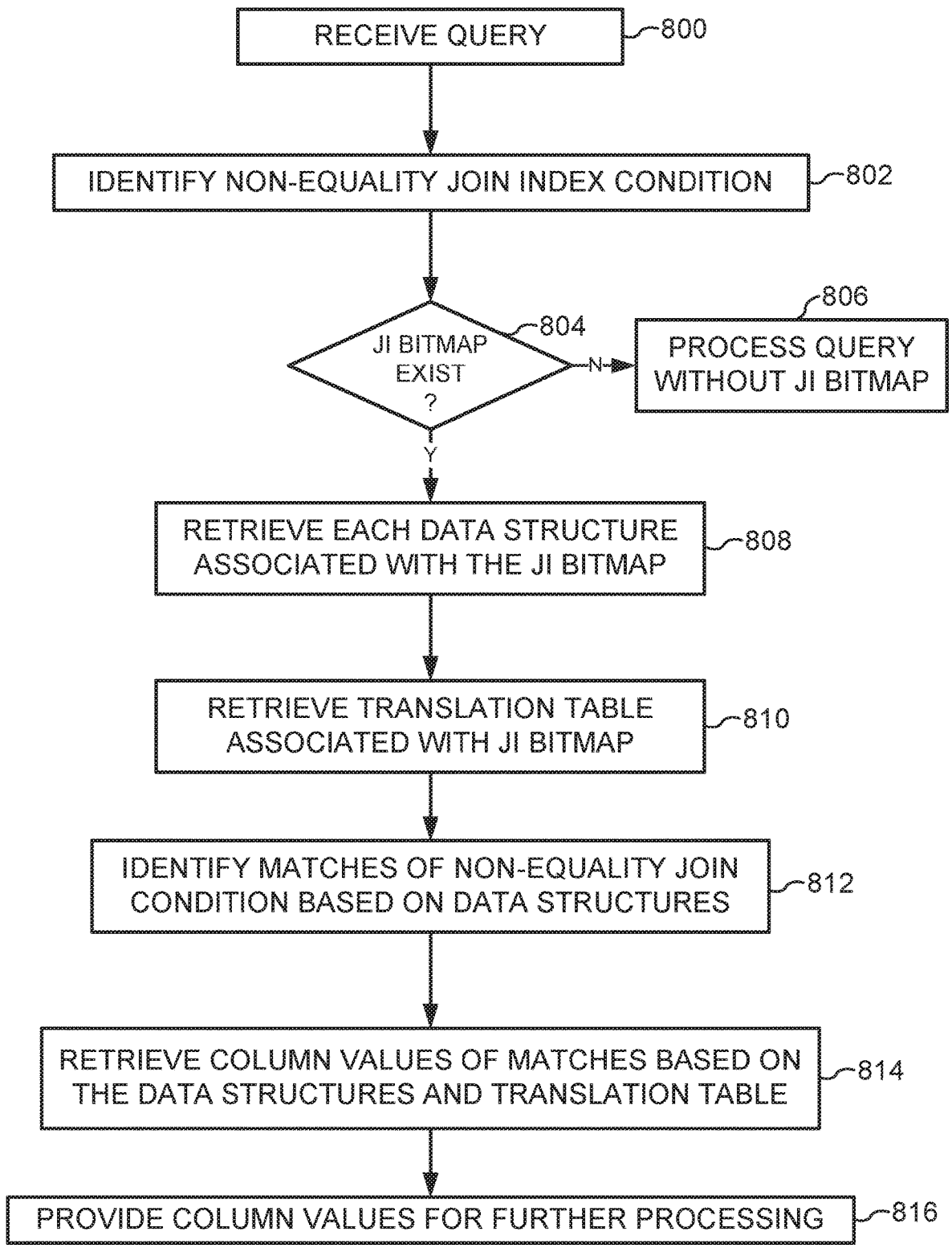
FIG. 8 is an operational flow diagram of an example database processing a query.

FIG. 8 is an operational flow diagram of accessing the compressed JI bitmap 400 for use in a query 130. In one example, the query 130 may be received by the RDBMS 102 (800). The RDBMS 102 may identify a non-equality condition involving columns C1 and C2 to which the JI bitmap 400 is associated (802). The RDBMS 102 may determine if a JI bitmap 400 has been created for the non-equality join condition involving column C1 and column C2 (804). If no JI bitmap 400 has been created, the RDBMS 102 may further process the query 130 without JI bitmap 400 (806). If a JI bitmap 400 exists, the RDBMS 102 may retrieve each data structure 600 from the DSFs 112 (808). The RDBMS 102 may also retrieve the translation table 700 (810). The RDBMS 102 may identify matches between column C1 and column C2 based on each compressed bit string stored in each data structure 600 (812). Due to the nature of the compression, the matches may be identified from the compressed bit strings and decompression is not required. The contents of the data structures 600 and the translation table 700 allow the RDBMS 102 to retrieve the column values of the respective table T1 row and table T2 row that match the non-equality join condition (814). The results of the non-equality join condition may be provided for further processing (816).

Figure 9:
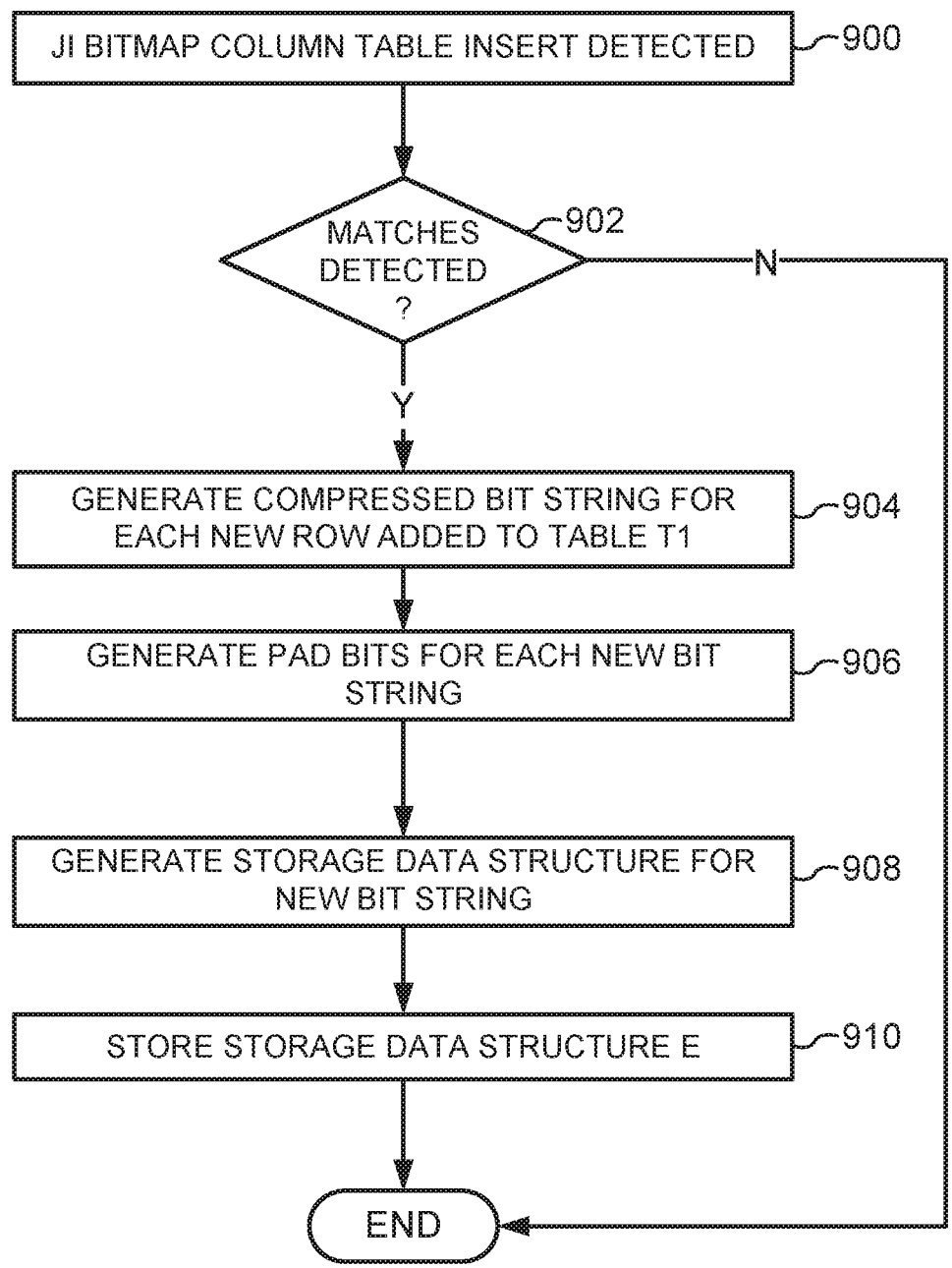
FIG. 9 is an operational flow diagram of an example database updating a bitmap based on a join condition in response to a row insertion associated with a table involved in the join condition.

After creation of a JI bitmap 400, the source tables, such as tables T1 and T2, may undergo alteration that include the insertion of new rows, deletion of rows, and/or updated data in current rows. A JI bitmap 400 may be altered based on the alteration made to one or both of the source tables. FIG. 9 is an operational flow diagram of the RDBMS 120 during a row insert to table T1. In one example, a row insert for table T1 may be received by the RDBMS 102. The RDBMS 102 may determine that the JI bitmap column table, table T1, for the JI bitmap 400 is being altered with a row addition (900). A row addition to the column table, table T1, of the JI bitmap 400 results in columns 404 being added to the JI bitmap 400. The RDBMS 102 retrieve a column C2 value of each table T2 row and determine if any matches occur based on the non-equality join index condition associated with the JI bitmap 400 (902). A "1" bit is set for a match and a "0" bit is set for a non-match in the respective position in the new column 404 of the JI bitmap 400 and the column 404 may be compressed into the compressed bit string in a manner such as that described in FIGS. 5A and 5B (904). The RDBMS 102 may also generate a pad word associated with the new bit string (906). The RDBMS 102 may generate a storage data structure 600 to indicate the rowid of the new row, the compressed bit string, and the pad word (908), or may generate an entry of a storage data structure 600 already exists locally as the associated access module 110. The RDBMS 102 may then store the newly created storage data structure 600 local to the access module 110 responsible for managing the new row (910). If multiple rows are added in a single database utility command, the RDBMS 102 may perform the described operations for each row added through the command.

Figure 10:
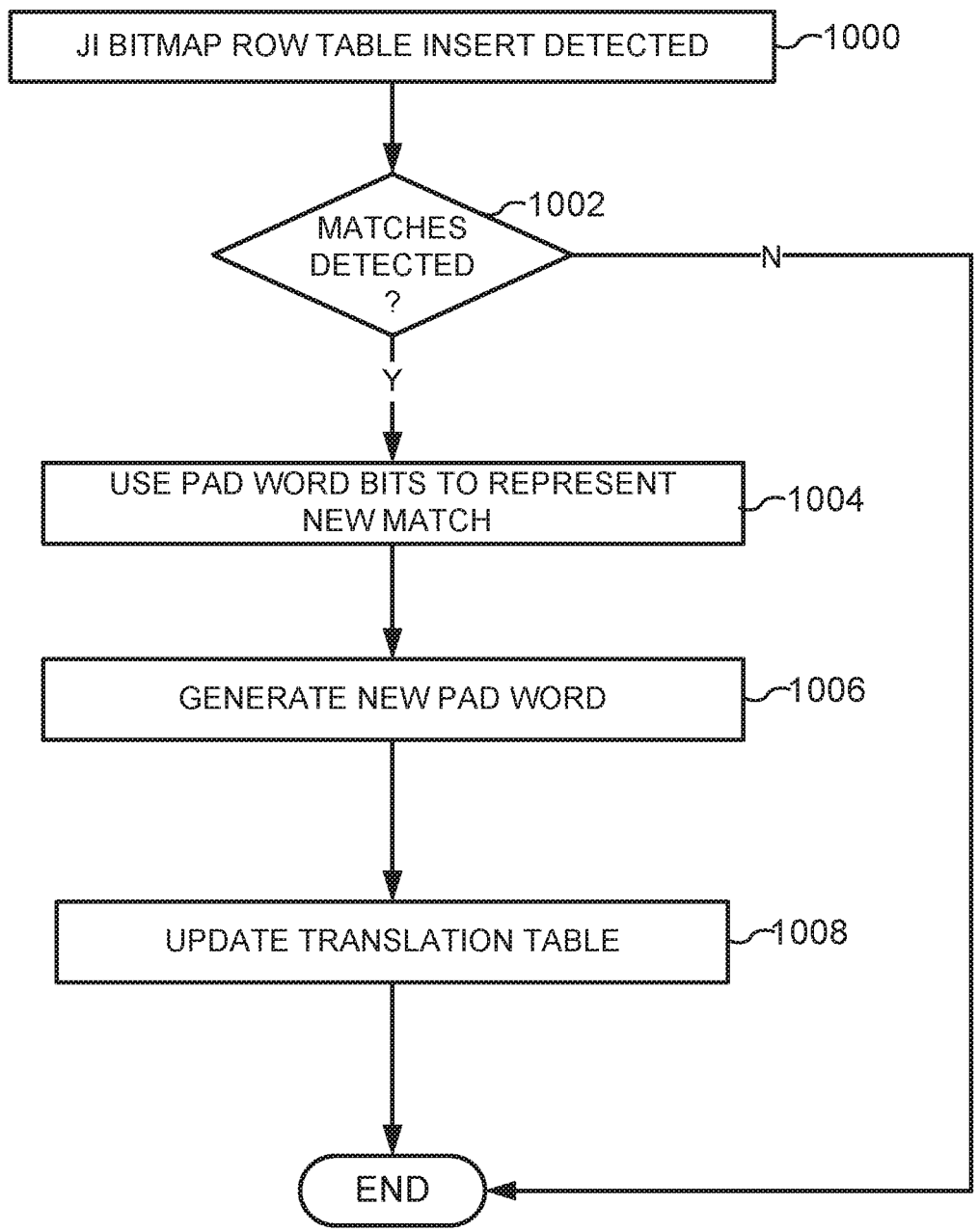
FIG. 10 is another operational flow diagram of an example database updating a bitmap based on a join condition in response to a row insertion associated with a table involved in the join condition.

The row table, table T2, may also undergo a row insertion, requiring the JI bitmap 400 to be updated. FIG. 10 is an example of an operational flow diagram during such an occurrence. The RDBMS 102 may detect that one or more rows are being added to table T2 (1000). For a newly added row to table T2, the RDBMS 102 may retrieve each value in column C1 value and determine if matches exist between the values of column C1 and the new column C2 value in the newly added row to table T2 (1002). If a match is not detected, no updates to the respective column 404 of the JI bitmap 400 or associated data are made. If a match is detected, a "1" bit is set in the respective position in the associated compressed bit string stored in a storage data structure 600 using the associated pad word (1004). The RDBMS 102 generate a new pad word to be stored in the associated storage data structure 600 (1006). The translation table 700 may be updated (1008). In one example, a new row of the translation table 700 may be created, which includes a new JI bitmap row index and the rowid of the new row added to table T2. If multiple rows are added in a single database utility command, the RDBMS 102 may perform the described operations for each row added to table T2 through the command.

In one example, a row of the column table, table T1, of the JI bitmap 400 may be deleted. Each column 404 in the JI bitmap 400 represents a value of the column C1. If a row of column C1 is deleted, the RDBMS 102 may detect the deletion is to be performed (1100). The RDBMS 102 may delete the storage data structure 600 information for the row of column C1 being deleted (1102), which no other data requiring manipulation. These operations may be performed for each row of column C1 being deleted.

In one example, a row of the JI bitmap row table, table T2, may be deleted. The RDBMS 102 may detect the deletion of a row 402 of the JI bitmap 400 (1200). The RDBMS 102 may set the table T2 rowid 704 to "0" in the translation table 700 (1202). A rowid of "0" indicates that the row is no longer valid. When the associated non-equality join index is submitted in a query 130, the RDBMS 102 may recognize the "0" in the table T2 rowid 704 as being invalid, and thus, ignore the relationship between the deleted row of column C1 and column C2.

Figure 11:
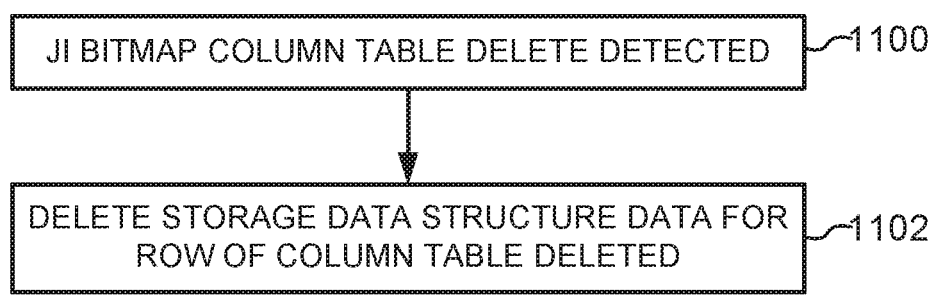
FIG. 11 is an operational flow diagram of an example database updating a bitmap based on a join condition in response to a row deletion associated with a table involved in the join condition.
Figure 12:
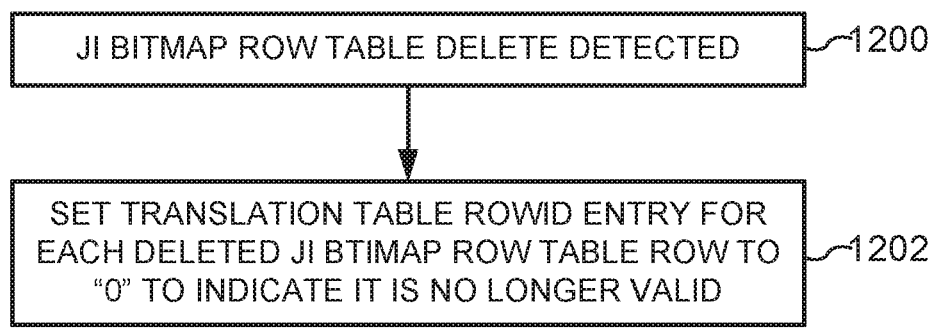
FIG. 12 is another example an operational flow diagram of an example database updating a bitmap based on a join condition to in response to a row deletion associated with a table involved in the join condition.

Updates to either column C1 or column C2 may also be carried out. An update to column C1 would require a re-determination of the column 404 of the JI bitmap index 400 associated with the updated value(s) of column C1. The updated column may be compressed and stored according to the techniques described herein. An update to column C2 may be reflected in the JI bitmap 400 through an insertion and deletion operation, such as that described in FIGS. 10 and 11. This may involve setting the JI bitmap row index value to 0 in the translation table associated with any updated values of column C2 and, adding a new entry using the rowid to the translation table 700 and making appropriate adjustments to any matching entries in the storage data structures 600.

The examples herein have been provided with the context of a relational database system. However, all examples are applicable to various types of data stores, such as file systems or other data stores suitable for organization and processing of data. Moreover, additional or fewer operations of the operational flow diagrams may be implemented in some examples and the orders may be changed in some examples. While various embodiments of the invention have been described, it will be apparent to those of ordinary skill in the art that many more examples and implementations are possible within the scope of the invention. Accordingly, the invention is not to be restricted except in light of the attached claims and their equivalents.

We claim:

1. A data store system comprising:
    an array of persistent storage devices configured to store a plurality of data store tables;
    a processor in communication with the array of persistent storage devices, the processor configured to;
    receive a query containing a non-equality join condition on a first column, from a first data store table and a second column on a second data store fable; and
    generate a bitmap based on the non-equality join condition, wherein the bitmap indicates respective matches match or non-match between the first column and second column in accordance with the non-equality join condition, wherein each bit represents a result of the non-equality join condition applied to the first column and the second column;
    compress each column of the bitmap to generate a compressed bit string, wherein, to compress each column of the bitmap, the processor is further configured to:
    select each column of the bitmap;
    segment bits in each selected column of the bitmap into segments of a predetermined size;
    determine of content of each segment;
    compare each segment to a next segment;
    in response to content of a segment being different than content of the next segment compress the segment separately from the next segment; and
    in response to determination, of two or more contiguous segments contain same content, compress the two or more contiguous segments together;
    generate at least one data structure, wherein the at least one data structure comprises a row identifier of the first column associated with bit string and the compressed bit string; and
    store said each compressed column of the bitmap, wherein the stored compressed column of the bitmap is used when the non-equality join condition is present in another received query.

2. The data store system of claim 1, wherein the processor is further configured to
    generate at least one data structure, wherein the at least one data structure comprises a row identifier of the first column associated with the bit string and the compressed bit string.

3. The data store system of claim 2, wherein the processor is further configured to generate an index table, wherein the index table comprises:
    an index indicative of a row position of each column value of the second table in the bitmap; and a corresponding row identifier of each row of the second column corresponding to a respective index.

4. The data store system of claim 3, wherein the processor is further configured to:
determine a row of the second table has been deleted; and
set the row identifier to an invalid value to indicate the row of the second table has been deleted.

5. The data store system of claim 2, wherein the processor is further configured to:
determine a row of the first table has been deleted; and
delete a compressed bit string and row identifier in an associated data structure that corresponds to the row of the first table.

6. The data store system of claim 1, wherein the processor is further configured to generate a plurality of pad bits associated with each bit string, wherein the pad bits allow the compressed bit string to be expanded, and wherein the pad bits are stored in a data structure corresponding to the associated bit string.

7. The data store system of claim 2, wherein the processor is further configured to:
determine that a row as been inserted into the first table;
identify respective matches between the inserted row of the first column and second column in accordance with the non-equality join condition; and
generate a bit string indicative of any matches identified between the inserted row of the first column and the second column in accordance with the non-equality join condition.

8. A method comprising;
receiving, by a processor, a query containing a non-equality join condition on a first column from a first data store table and a second column on a second data store table; and
generating, by the processor, a bitmap based on the non-equality join condition, wherein the bitmap indicates respective matches between the first column and second column in accordance with the non-equality join condition, wherein the bitmap is implemented when the non-equality join condition is present in another received query;
compressing, by the processor, each column of the bitmap to generate a compressed bit string, wherein the compressing comprises:
selecting each column of the bitmap;
segmenting bits in each selected column of the bitmap into segments of a predetermined size;
determining of content of each segment;
comparing each segment to a next segment;
in response to content of a segment being different than content of the next segment, compressing the segment separately from the next segment; and
in response to determination of two or more contiguous segments contain same content, compressing the two or more contiguous segments together; and
storing said each compressed column of the bitmap, wherein the stored compressed column of the bitmap is used when the non-equality join condition is present in another received query.

9. The method of claim 8, further comprising
generating at least one data structure, wherein the at least one data structure comprises a row identifier of the first column associated with the bit string and the compressed bit string.

10. The method of claim 9, further comprising generating an index table, wherein the index table comprises an index indicative of a row position of each column value of the second table in the bitmap and a corresponding row identifier of each row of the second column corresponding to a respective index.

11. The method of claim 10, further comprising:
determining a row of the second table has been deleted; and
setting the row identifier in the index table associated with the row to an invalid value to indicate the row of the second table has been deleted.

12. The method of claim 9, further comprising:
determining that a row as been inserted into the first table;
identifying respective matches between the inserted row of the first column and second column in accordance with the non-equality join condition; and
generating a bit string indicative of any matches identified between the inserted row of the first column and the second column in accordance with the non-equality join condition.

13. The method of claim 8, further comprising generating a plurality of pad bits associated with each bit string, wherein the pad bits allow the compressed bit string to be expanded, and wherein the pad bits are stored in a data structure corresponding to the associated bit string.

14. The method of claim 8, further comprising:
determining a row of the first table has been deleted; and
deleting a compressed bit string and row identifier in an associated data structure that corresponds to the row of the first table.

15. A non-transitory computer-readable medium encoded with a plurality of instructions executable by a processor, the plurality of instructions comprising:
instructions to receive a query containing a non-equality join condition on a first column from a first data store table and a second column on a second data store table; and
instructions to generate a bitmap based on the non-equality join condition, wherein the bitmap indicates respective matches between the first column and second column in accordance with the non-equality join condition, wherein the bitmap maybe is used each time the non-equality join condition is present in another received query;
instructions to compress each column of the bitmap to generate a compressed bit string, wherein the instructions to compress comprise:
instructions to select each column of the bitmap;
instructions to segment bits in each selected column of the bitmap into segments of a predetermined size;
instructions to determine of content of each segment;
instructions to compare each segment to a next segment;
in response to content of a segment being different than content of the next segment, instructions to compress the segment separately from the next segment; and
in response to determination of two or more contiguous segments contain same content, instructions to compress the two or more continuous segments together; and
instructions to store said each compressed column of the bitmap, wherein the stored compressed column of the bitmap is used when the non-equality join condition is present in another received query.

16. The non-transitory computer-readable medium of claim 15, wherein the plurality of instructions further comprises instructions to generate at least one data structure, wherein the at least one data structure comprises a row identifier of the first column associated with the bit siring and the compressed bit string.

17. The non-transitory computer-readable medium of claim 16, wherein the plurality of instructions further comprises instructions to generate an index table, wherein the index table comprises an index indicative of a row position of each column value of the second table in the bitmap and a corresponding row identifier of each row of the second column corresponding to a respective index.

18. The non-transitory computer-readable medium of claim 15, wherein the plurality of instructions further comprises: instructions to determine a row of the second table has been deleted: and instructions to set the row identifier in the index table to an invalid value to indicate the row of the second table has been deleted.

19. The non-transitory computer-readable medium of claim 15, wherein the plurality of instructions further comprises instructions to generate a plurality of pad bits associated with each bit string, wherein the pad bits allow the compressed bit string to be expanded, and wherein the pad bits are stored in a data structure corresponding to the associated bit string.

20. The non-transitory computer-readable medium of claim 15, wherein the plurality of instructions further comprises:
- instructions to determine a row of the first table has been deleted; and
- instructions to delete a compressed bit string and row identifier in an associated data structure that corresponds to the row of the first table.

* * * * *